United States Patent [19]

Osaka

[11] Patent Number: 5,677,814
[45] Date of Patent: Oct. 14, 1997

[54] RECORDING/REPRODUCING APPARATUS

[75] Inventor: Tomohiko Osaka, Yamagata, Japan

[73] Assignee: Mitsumi Electric Co., Ltd., Tokyo, Japan

[21] Appl. No.: 754,613

[22] Filed: Nov. 21, 1996

Related U.S. Application Data

[63] Continuation of Ser. No. 493,823, Jun. 22, 1995, abandoned.

[30] Foreign Application Priority Data

Jul. 13, 1994 [JP] Japan .................. 6-184027

[51] Int. Cl.⁶ .............. G11B 5/48; G11B 21/16; G11B 5/55; G11B 21/08
[52] U.S. Cl. ........................... 360/104; 360/106
[58] Field of Search ................... 360/106, 104

[56] References Cited

U.S. PATENT DOCUMENTS 5,023,735  6/1991  Kuzuhara ................. 360/104
5,187,624  2/1993  Shigemoto ................ 360/104

FOREIGN PATENT DOCUMENTS 2191548  12/1987  United Kingdom .

*Primary Examiner*—Robert S. Tupper
*Assistant Examiner*—Adriana Giordana
*Attorney, Agent, or Firm*—Whitham, Curtis, Whitham & McGinn

[57] ABSTRACT

A head feeding mechanism of a magnetic recording/reproducing apparatus includes a 0-side carriage which carries a 0-side magnetic head provided on a surface area close to the tip end of the 0-side carriage and is fed in a lengthwise direction of a slot of a magnetic disk holder for holding a magnetic disk by means of a guide device provided in a unit frame. The head feeding mechanism includes a thin portion formed at the end of the 0-side carriage, an opening formed at the center of the thin portion into which connection pins of the 0-side magnetic head can be inserted, a head seat surface which is matched in shape with the 0-side magnetic head and is formed on the front side of the thin portion, and a housing groove formed on the rear side of the thin portion for housing a connection end of a flexible printed board.

11 Claims, 4 Drawing Sheets

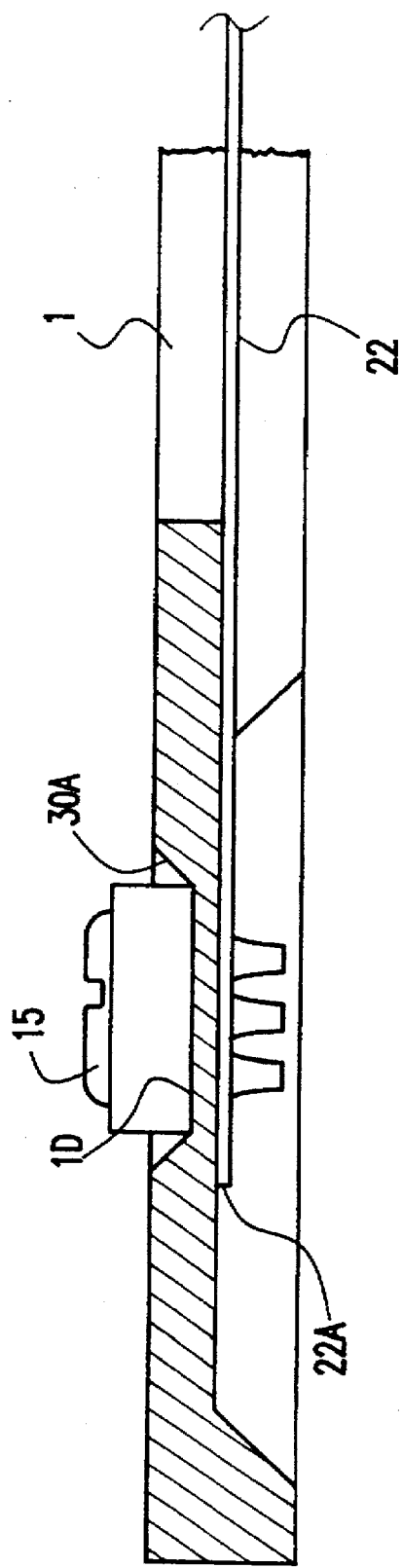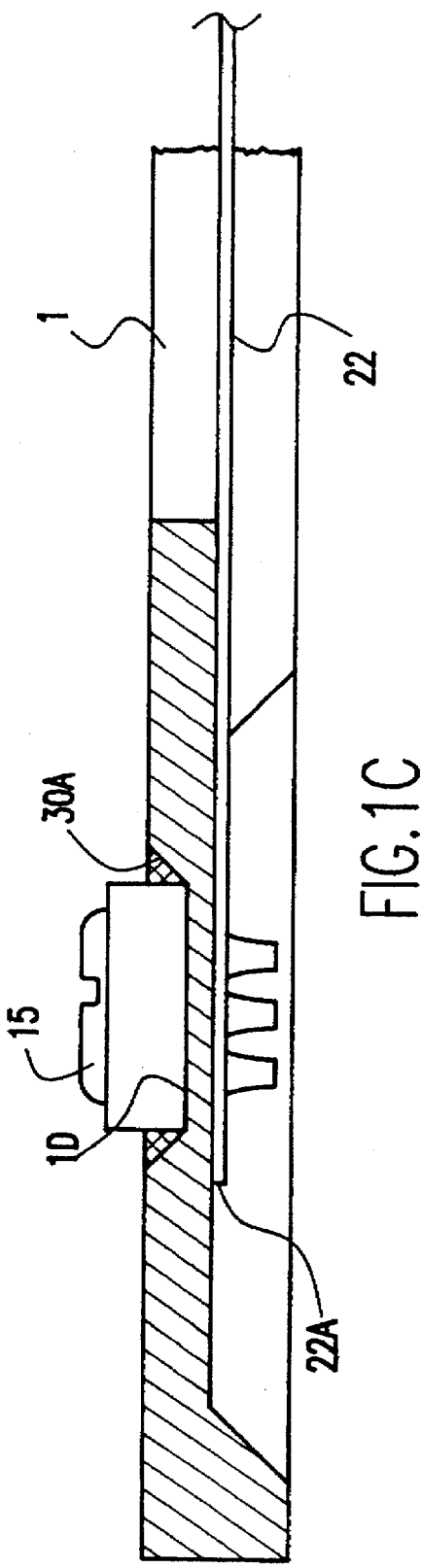

RECORDING/REPRODUCING APPARATUS

This is a Continuation of application Ser. No. 08/493,823 filed Jun. 22, 1995 abandoned.

BACKGROUND OF THE INVENTION

1. Field of the Invention

This invention relates to a magnetic recording/reproducing apparatus which employs a magnetic disk as a recording medium, and more particularly to a head feed mechanism of the magnetic recording/reproducing apparatus.

2. Related Art

As is well known, a head feed mechanism shown in FIGS. 4 and 5 is used in a magnetic recording/reproducing apparatus which employs a so-called 3.5" floppy disk as a recording medium.

Reference symbol "1A" designates a 0-side carriage guided along a guide rod 4A of a unit frame 3A which extends in a parallel direction to a slot 2a of a magnetic disk holder 2A. The 0-side carriage 1A is formed into a rigid member by pressing a thin metal plate into a shallow dish shape.

A resilient leaf spring 6 is attached to a base 1a of the 0-side carriage 1A, in cantilever fashion, via a spacer 5 by means of a mounting bracket 7A and fixing screws 8A. Moreover, a base 9a of a 1-side carriage 9A, formed into a rigid member by pressing a thin metal plate, is supported by a free end 6a of the resilient leaf spring 6 by means of mounting screws 10. Driven lugs 9b projecting from an intermediate portion of the 1-side carriage 9A are brought into contact with an aperture rim 2b of a slot 2a of the magnetic disk holder 2A. A support rod 11 is fixed to mounting lugs 7a of the mounting bracket 7A. A tension spring 12A is attached to the support rod 11 so as to bring the driven lugs 9b of the 1-side carriage 9A into pressurized contact with the aperture rim 2b of the magnetic disk holder 2A.

A 0-side magnetic head 15A and a 1-side magnetic head 16A are respectively fixed to surface areas of the 0-side carriage 1A and the 1-side carriage 9A close to the tip end thereof via gimbals 13A and 14A made of a flexible soft metal plate. Information is recorded onto or reproduced from the surface of a non-illustrated magnetic disk by means of the 0-side magnetic head 15A and the 1-side magnetic head 16A.

A feed motor 17A is disposed on a surface area of the unit frame 3A adjacent to the 0-side carriage 1A. A parallel pin 21, being fixed to an extended portion 1b of the 0-side carriage 1A by means of a presser plate 19 and a screw 20, is engaged with a feed screw 18A of the feed motor 17A extending parallel to the guide rod 4A. By virtue of the rotary motion of the feed screw 18A, the 0-side carriage 1A and the 1-side carriage 9A are fed in a direction of the radius of the magnetic disk.

The 0-side carriage 1A and the 1-side carriage 9A of the previously mentioned conventional magnetic recording/reproducing apparatus are formed by pressing a metal plate, and hence there is an inherent limitation in cost reduction owing to mass production. Moreover, since the head feed mechanism is constituted of a plurality of parts, it is impossible to reduce the manufacturing cost.

For this reason, a head feed mechanism of a magnetic recording/reproducing apparatus having a plastic 0-side carriage shown in FIG. 6 has been developed. In other words, the entire 0-side carriage 1B is made of hard plastic and formed into a rectangular plate by injection molding. A thin portion 1d at which a 0-side magnetic head 15B is fixedly positioned is formed in an area in the vicinity of the tip end of the 0-side carriage 1B. A connection pin of the 0-side magnetic head 15B passing through the thin portion 1d is soldered to the tip end of a flexible printed board 22. A leaf spring base 9c of the 1-side carriage 9B formed by pressing a thin metal plate is fixed to a base seat 1c of the 0-side carriage 1B by means of a splice plate 23 and a fixing screw 8B.

The 1-side carriage 9B is attracted counterclockwise by means of a spring 12B supported by a support pin 23 which is integrally formed together with the base seat 1c of the 0-side carriage 1B. A 1-side magnetic head 16B is fixed to an area on a lower side in the vicinity of the tip end of the 1-side carriage 9B via gimbals 14B.

The second conventional head feed mechanism of the magnetic recording/reproducing apparatus also has a problem. Specifically, in the case of the 0-side carriage 1B, the tip end of the flexible printed board 22B is soldered to the connection pin of the 0-side magnetic head 15B after the connection pin has been passed through the thin portion 1d of the 0-side carriage 1B. This structure requires strict accuracy when the 0-side magnetic head 15B is positioned to the 0-side carriage 1B. In addition, the 0-side magnetic head 15B is indirectly fixed to the 0-side carriage 1B by the solder of the flexible printed board 22B, and hence the 0-side magnetic head 15B is prone to have an inclination with respect to the 0-side carriage 1B. This tends to result in poor quality products.

It is deemed that such a problem of the lifting of the 0-side magnetic head 15B with respect to the 0-side carriage 1B can be solved by adhering the 0-side magnetic head 15B to the 0-side carriage 1B using an adhesive. However, it is difficult to solve this problem, i.e., the problem of positioning of the 0-side magnetic head 15B to the 0-side carriage 1B which can be mechanically assembled, using only the adhesive.

SUMMARY OF THE INVENTION

In view of the previously mentioned problems of the conventional head feed mechanism of the magnetic recording/reproducing apparatus, the object of the present invention is to obtain a head feed mechanism of a magnetic recording/reproducing apparatus which has a reduced number of parts, which can realize the reduction of manufacturing cost owing to mass production, and which can be mechanically assembled by ensuring the positioning of a 0-side magnetic head relative to a 0-side carriage.

To achieve this aim, the present invention provides a head feed mechanism of a magnetic recording/reproducing apparatus including a 0-side carriage which carries a 0-side magnetic head provided on a surface area of the 0-side carriage close to the tip end of the same and is fed in a lengthwise direction of a slot of a magnetic disk holder for holding a magnetic disk by means of a guide means provided in a unit frame. The head feed mechanism comprises a thin portion formed at the end of the 0-side carriage, an opening formed at the center of the thin portion into which connection pins of the 0-side magnetic head can be inserted, a head seat surface which is matched in shape with the 0-side magnetic head and is formed on the front side of the thin portion, and a housing groove formed on the rear side of the thin portion for housing a connection end of a flexible printed board.

BRIEF DESCRIPTION OF THE DRAWINGS

FIG. 1B illustrates a gap having a triangular cross-section;

FIG. 1C illustrates the gap having been filled with an adhesive;

DETAILED DESCRIPTION OF THE PREFERRED EMBODIMENT

Turning to FIGS. 1A through 3, a preferred embodiment of the present invention will be described in detail hereunder.

Figure 1A:
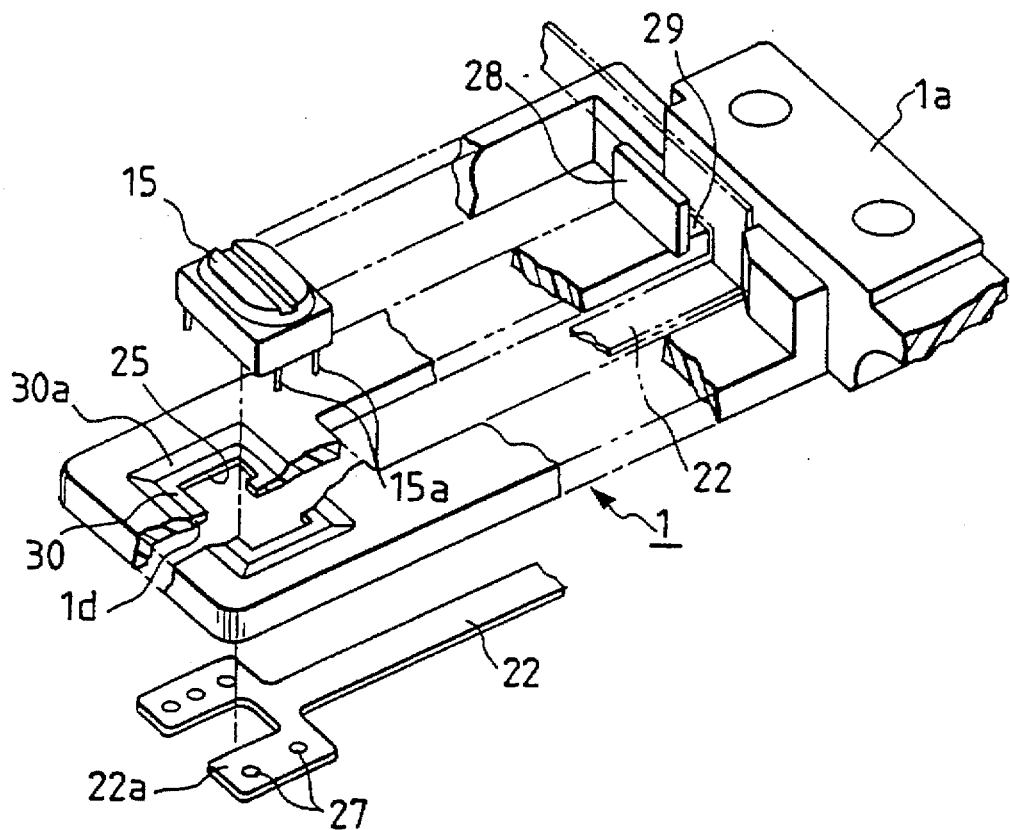
FIG. 1A is an enlarged exploded view showing the relationship between a 0-side carriage and a 0-side magnetic head used in a head feed mechanism of the present invention.
Figure 2:
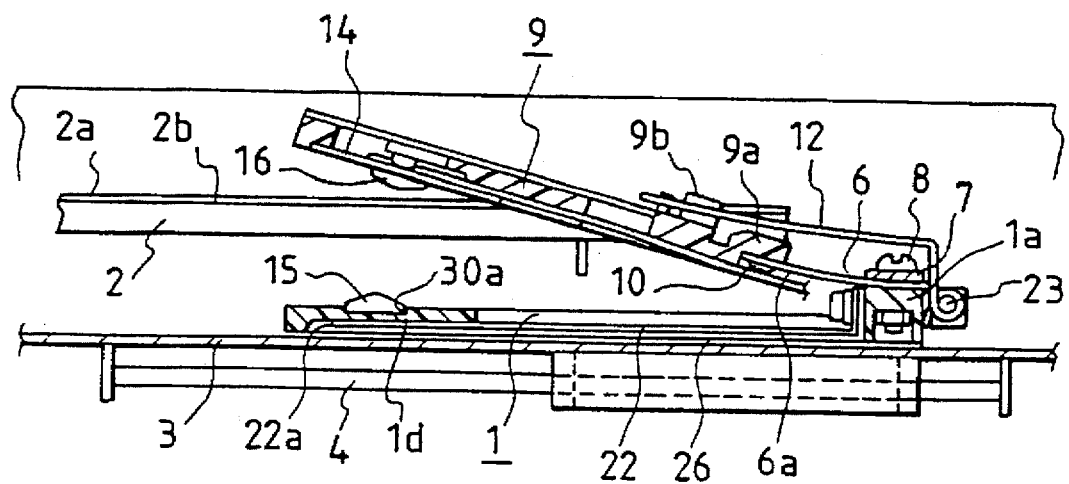
FIG. 2 is a cross-sectional view of the entire head feed mechanism shown in FIG. 1A.

FIG. 2 is a cross-sectional view of a head feed mechanism of a magnetic recording/reproducing apparatus of the present invention. Reference numeral 1 designates a 0-side carriage guided along a guide rod 4 of a unit frame 3 extending in a parallel direction to a slot 2a of a magnetic disk holder 2. As will be described later with reference to FIG. 1A, the 0-side carriage 1 is made of hard plastic and formed into a rectangular rigid member by injection molding.

A resilient leaf spring 6 is fixed to a base seat 1a of the 0-side carriage 1 in a cantilever fashion by means of a mounting bracket 7 and fixing screws 8. A base 9a of a 1-side carriage 9, also being made of hard plastic and formed into a rigid member by pressing, is supported by a free end 6a of the resilient leaf spring 6 by means of mounting screws 10. Driven lugs 9b projecting from an intermediate portion of the 1-side carriage 9 are brought into contact with an aperture rim 2b of the slot 2a of the magnetic disk holder 2. A support pin 23 is integrally formed at a rear portion of the base seat 1a of the 0-side carriage 1, and a spring 12 is attached to the support pin 23 so as to bring the driven lugs 9b of the 1-side carriage 9 into pressurized contact with the aperture rim 2b of the magnetic disk holder 2.

As with the prior art, a 1-side magnetic head 16 is fixed to a surface area near the tip end of the 1-side carriage 9 via gimbals 14 made of a soft thin metal plate.

Figure 3:
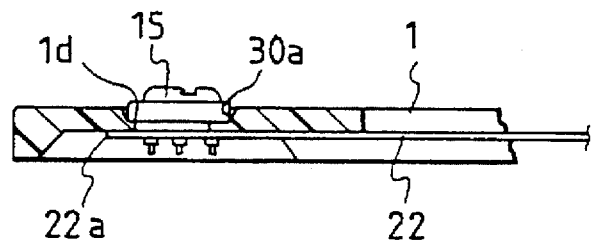
FIG. 3 is an enlarged cross-sectional view of the principal elements of the 0-side carriage of the head feed mechanism shown in FIG. 1A.
Figure 4:
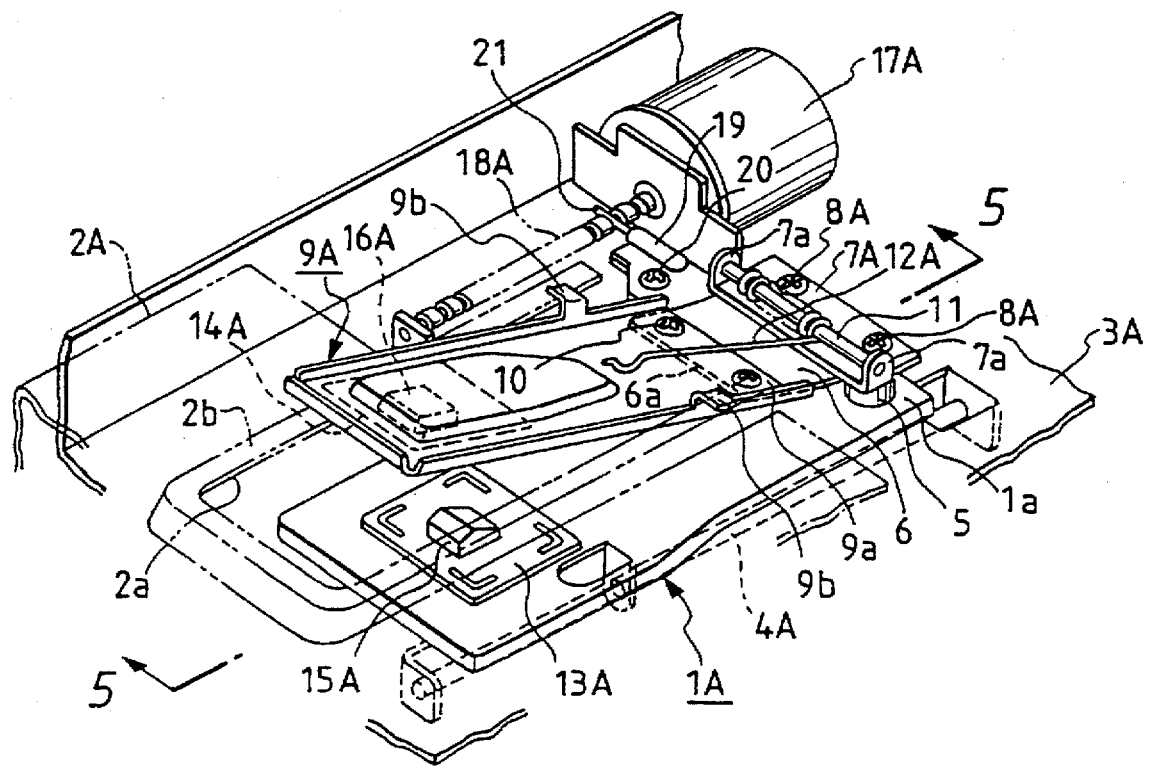
FIG. 4 is a perspective view of the entire head feed mechanism of a conventional magnetic recording/reproducing apparatus.
Figure 5:
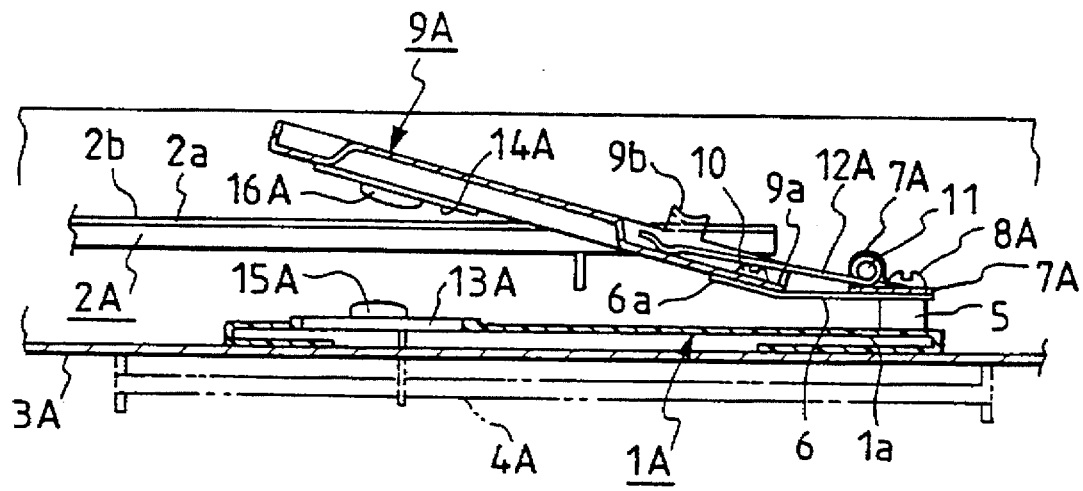
FIG. 5 is a cross-sectional view taken along a line 5—5 shown in FIG. 4.
Figure 6:
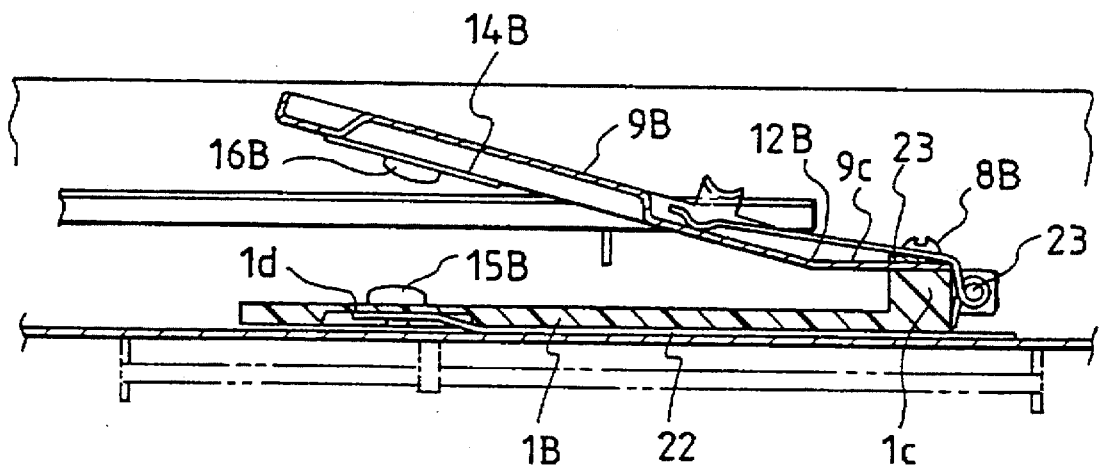
FIG. 6 is a cross-sectional view of another conventional head feed mechanism corresponding to the cross-sectional view shown in FIG. 5.

FIGS. 1A and 3 show the 0-side carriage 1 which characterizes the present invention. The 0-side carriage 1 has a thin portion 1d formed at an area close to the end of the carriage. In other words, an opening 25 through which connection pins 15a of the 0-side magnetic head 15 pass is formed at the center of the thin portion 1d. The leading ends of the connection pins 15a of the 0-side magnetic head 15a, the pins passing through the opening 25, are soldered to a connection end 22a of the flexible printed board 22 positioned within a housing groove 26 formed in a lower surface of the 0-side carriage 1. Specifically, the connection end 22a of the flexible printed board 22 having through holes 27, the holes permitting insertion of each of the connection pins 15 of the 0-side magnetic head 15, is housed in an end portion 26a of the enlarged housing groove 26. The flexible printed board 22 is led to a point just in front of the base seat 1a through the housing groove 26 which extends in a lengthwise direction of the 0-side carriage 1. The printed board 22 is led to the outside of the head feed mechanism from a groove 29 formed between a guide leaf 28, projecting from the surface of the 0-side carriage 1, and the base seat 1a.

A rectangular head seat surface 30 having the same size as the shape of the 0-side magnetic head 15 is formed on the front-side of the thin portion 1d of the 0-side carriage 1. An inclined surface 30a surrounds the head seat surface 30. With this configuration, when the 0-side magnetic head 15 is positioned at the head seat surface 30, a gap 30a having a triangular cross section as shown in FIG. 1A is formed around the 0-side magnetic head 15 by virtue of the presence of the inclined surface 30a. Accordingly, it is possible to ensure the fixing of the 0-side magnetic head 15 to the 0-side carriage 1 by filling the gap with an adhesive. The adhesive 30a hardens to form a relatively rigid resin portion, as shown in FIG. 1C.

By virtue of the previously mentioned structure of the head feed mechanism in the illustrated embodiment, it is possible to ensure the fixing of the 0-side magnetic head 15 and the connection end 22a of the flexible printed board 22 to the 0-side carriage 1 without the use of gimbals. Namely, when the 0-side magnetic head 15 is substantially positioned so as to match with the thin portion 1d of the 0-side carriage and then fitted into the head seat surface 30, the 0-side magnetic head 15 is guided by the inclined surface 30a and is securely seated in the head seat surface 30 without any inclination. Such a fitting operation can be rationalized by mechanical operation of, for example, precision robots. Therefore, it is possible to fix the 0-side magnetic head 15 to the 0-side carriage 1 without any inclination simply by filling the gap between the 0-side magnetic head 15 and the inclined surface 30a of the head seat surface 30 with an adhesive after the 0-side magnetic head 15 has been fitted into the head seat surface 30.

The recess for accommodating the magnetic head 15 is formed in the upper surface of the 0-side carriage 1. The lower surface of the magnetic head 15 is mounted on the thin portion 1d which is formed at the peripheral edge portion of the opening 25 of the 0-side carriage 1. Since the magnetic head 15 is positioned within the 0-side carriage 1 and is attached by the resin located within the triangular 45° gap 30a, the head is securely fixed to the 0-side carriage 1. In addition, this structure also increases the strength of the 0-side carriage 1d.

The connection pins 15a of the 0-side magnetic head 15 which project to the rear side through the opening 25 of the thin portion 1a are fitted into the through holes 27 formed in the connection end 22a of the flexible printed board 22. It is possible to easily finish the process of assembling the 0-side carriage 1, the 0-side magnetic head 15 and the flexible printed board 22 together by simply soldering the connection pins 15a to the connection end 22a.

As is evident from the above description, according to the present invention, the 0-side carriage is formed from plastic. Accordingly, the number of gimbals is reduced; manufacturing cost is reduced due to mass production being possible. Moreover, the head seat surface surrounded by the inclined surface is formed in a corresponding surface of the thin portion of the 0-side carriage. This makes it possible to ensure the adhesion of the 0-side magnetic head to the 0-side carriage, which results in possible automatic assembly of the head feed mechanism.

What is claimed is:

1. A head feeding mechanism for a magnetic recording/ reproducing apparatus comprising:

a first-side carriage for carrying a first-side magnetic head, provided on a surface area adjacent a tip end of the first-side carriage, said first-side carriage being made of a resin, said first-side magnetic head having a recording surface and a lower surface opposite said recording surface;

a thin portion formed at the tip end of the first-side carriage, said thin portion having an opening formed at a center of the thin portion into which connection pins of the first-side magnetic head are inserted; and said thin portion having a head seat surface matched in shape with said lower surface of said first-side magnetic head and formed on a front side of said thin portion; said lower surface of said first-side magnetic head being seated on said head seat surface;

wherein an inclined surface, at an angle with said head seat surface, surrounds said head seat surface, and wherein, when said first-side magnetic head is positioned on said head seat surface, a gap having a substantially triangular cross-section is formed between a peripheral surface of said magnetic head and said inclined surface, said head feeding mechanism further comprising a second resin filling said gap.

2. A head feeding mechanism for a magnetic recording/ reproducing apparatus as claimed in claim 1, further comprising a housing groove for housing a connection end of a flexible printed board formed on a rear side of said thin portion.

3. A head feeding mechanism for a magnetic recording/ reproducing apparatus as claimed in claim 1, further comprising:

guide means, operatively coupled to said first-side carriage, for feeding said first-side carriage in a lengthwise direction of a slot of a magnetic disk holder, said magnetic disk holder for holding a magnetic disk.

4. A head feeding mechanism according to claim 1, wherein said thin portion has a thickness less than that of other portions of said first-side carriage.

5. A head feeding mechanism according to claim 4, wherein said head seat surface has a rectangular shape, and an outer periphery of said rectangular shape has a substantially same size as that of said peripheral surface of said first-side magnetic head, and wherein a housing groove extends in a lengthwise direction of said first-side carriage.

6. A head feeding mechanism according to claim 1, further comprising a printed circuit board for receiving said connection pins of said first-side magnetic head, wherein said first-side magnetic head and said printed circuit board are coupled to said first-side carriage devoid of using a gimbal.

7. A head feeding mechanism according to claim 1, wherein said head seat surface has a rectangular shape, and an outer periphery of said rectangular shape has a substantially same size and shape of those of a peripheral surface of said lower surface of said first-side magnetic head.

8. A head feeding mechanism according to claim 1, said second resin comprising an adhesive.

9. A head feeding mechanism according to claim 1, wherein said inclined surface aligns said first-side head on said first-side carriage.

10. A head feeding mechanism according to claim 1, wherein said inclined surface aligns said first-side head such that said first side head is positioned on said head seat surface.

11. A head feeding mechanism according to claim 1, wherein said inclined surface forms a 45 degree angle with said head seat surface.

* * * * *